US009765702B2

United States Patent
Gauthier et al.

(10) Patent No.: US 9,765,702 B2
(45) Date of Patent: Sep. 19, 2017

(54) ENSURING NON-EXCESSIVE VARIATION OF GRADIENTS IN AUTO-TUNING A GAS TURBINE ENGINE

(71) Applicant: ANSALDO ENERGIA IP UK LIMITED, London (GB)

(72) Inventors: Donald Gauthier, Jupiter, FL (US); Hany Rizkalla, Stuart, FL (US); Peter John Stuttaford, Jupiter, FL (US)

(73) Assignee: ANSALDO ENERGIA IP UK LIMITED (GB)

( * ) Notice: Subject to any disclaimer, the term of this patent is extended or adjusted under 35 U.S.C. 154(b) by 600 days.

(21) Appl. No.: 14/213,366

(22) Filed: Mar. 14, 2014

(65) Prior Publication Data
US 2014/0277790 A1    Sep. 18, 2014

Related U.S. Application Data

(60) Provisional application No. 61/790,161, filed on Mar. 15, 2013.

(51) Int. Cl.
*F02C 9/22* (2006.01)
*G05B 15/02* (2006.01)
(Continued)

(52) U.S. Cl.
CPC .............. *F02C 9/22* (2013.01); *F02C 9/00* (2013.01); *F02C 9/48* (2013.01); *G05B 15/02* (2013.01); *F05D 2260/964* (2013.01)

(58) Field of Classification Search
CPC ..... F02C 9/22; F02C 9/00; F02C 9/48; G05B 15/02; F05D 2260/964
See application file for complete search history.

(56) References Cited

U.S. PATENT DOCUMENTS

| 4,157,012 A | * | 6/1979 | DuBell | F02C 7/232 |
| | | | | 137/513.7 |
| 4,197,699 A | * | 4/1980 | Parker | F01D 17/16 |
| | | | | 60/39.163 |

(Continued)

OTHER PUBLICATIONS

AGARD, "Recommended Practices for Measurement of Gas Path Pressures and Temperatures for Performance Assessment of Aircraft Turbine Engines and Components", Jun. 1990, AGARD Advisory Report No. 245.*

(Continued)

*Primary Examiner* — Mohammad Ali
*Assistant Examiner* — Kelvin Booker
(74) *Attorney, Agent, or Firm* — Hovey Williams LLP

(57) ABSTRACT

Methods are provided for ensuring non-excessive variation of a gradient of an applied split bias versus firing temperature of a gas turbine engine. It is determined that an incremental split bias step is to be taken, and a current firing temperature of the gas turbine engine is identified on a graph. A first difference between a split schedule and an applied schedule gradient is calculated using lower firing temperatures than the current firing temperature, and a second difference is calculated using higher firing temperatures. If the first difference exceeds a predetermined limit, the incremental split bias step is not allowed at a lower firing temperature, and similarly, if the second difference exceeds a predetermined limit, the incremental split bias step is not allowed at a higher firing temperature.

18 Claims, 10 Drawing Sheets

(51) Int. Cl.
F02C 9/00 (2006.01)
F02C 9/48 (2006.01)

(56) References Cited

U.S. PATENT DOCUMENTS

| | | | | |
|---|---|---|---|---|
| 4,244,181 A * | 1/1981 | Wiher | F02C 6/20 60/39.25 |
| 4,266,401 A * | 5/1981 | Sumegi | F02C 6/20 477/181 |
| 4,274,253 A * | 6/1981 | Bolliger | F02C 6/20 60/39.25 |
| 4,274,254 A * | 6/1981 | Jansen | F02C 7/105 60/39.25 |
| 5,190,020 A * | 3/1993 | Cho | F02D 41/14 123/478 |
| 5,584,171 A | 12/1996 | Sato et al. | |
| 6,354,268 B1 * | 3/2002 | Beck | F02B 29/0418 123/435 |
| 7,269,953 B2 | 9/2007 | Gadde et al. | |
| 7,469,545 B2 | 12/2008 | Riley | |
| 7,938,097 B2 * | 5/2011 | Sparling | F02B 57/10 123/200 |
| 8,437,941 B2 | 5/2013 | Chandler | |
| 9,097,185 B2 | 8/2015 | Demougeot et al. | |
| 9,317,983 B2 * | 4/2016 | Ricci | H04W 4/046 |
| 9,328,669 B2 * | 5/2016 | Rizkalla | F02C 9/22 |
| 9,440,851 B2 * | 9/2016 | Hwang | C01B 3/382 |
| 2002/0170548 A1 * | 11/2002 | Masters | F02P 9/002 123/641 |
| 2002/0195086 A1 * | 12/2002 | Beck | B24B 3/003 123/435 |
| 2003/0144787 A1 * | 7/2003 | Davis, Jr. | F02C 7/228 701/100 |
| 2004/0050061 A1 * | 3/2004 | Schmotolocha | F02K 3/10 60/761 |
| 2004/0123849 A1 * | 7/2004 | Bryant | F01B 7/12 123/563 |
| 2004/0177837 A1 * | 9/2004 | Bryant | F02B 29/0418 123/559.1 |
| 2004/0219079 A1 * | 11/2004 | Hagen | F01K 21/047 422/607 |
| 2004/0255595 A1 * | 12/2004 | Morgan | F02C 9/28 60/773 |
| 2005/0042151 A1 * | 2/2005 | Alward | B01D 39/2082 422/177 |
| 2005/0050901 A1 | 3/2005 | Little | |
| 2005/0107941 A1 * | 5/2005 | Healy | F02C 9/28 701/100 |
| 2005/0114010 A1 * | 5/2005 | Healy | F02C 9/28 701/100 |
| 2005/0247066 A1 * | 11/2005 | Myhre | F01D 17/02 60/803 |
| 2006/0000219 A1 * | 1/2006 | Myhre | F01D 17/02 60/772 |
| 2006/0130470 A1 * | 6/2006 | Dorn | F02B 43/10 60/309 |
| 2007/0113560 A1 * | 5/2007 | Steber | F23N 5/003 60/773 |
| 2007/0214795 A1 | 9/2007 | Cooker et al. | |
| 2007/0295008 A1 * | 12/2007 | Shuttleworth | F02B 75/26 60/605.2 |
| 2008/0071427 A1 * | 3/2008 | Szepek | F02C 9/42 700/287 |
| 2008/0243352 A1 * | 10/2008 | Healy | F01D 17/00 701/100 |
| 2009/0044513 A1 * | 2/2009 | Fuller | F02C 9/28 60/39.281 |
| 2009/0063003 A1 * | 3/2009 | Meadows | F01D 21/003 701/100 |
| 2009/0222187 A1 * | 9/2009 | Martling | F02C 9/28 701/100 |
| 2010/0050639 A1 * | 3/2010 | Janus | F02C 1/04 60/682 |
| 2010/0071375 A1 * | 3/2010 | Myhre | F23M 11/045 60/740 |
| 2010/0168980 A1 * | 7/2010 | Fuller | F02C 7/228 701/100 |
| 2010/0300108 A1 * | 12/2010 | Demougeot | F02C 7/228 60/773 |
| 2011/0146291 A1 * | 6/2011 | Snider | F01D 19/00 60/778 |
| 2011/0265487 A1 * | 11/2011 | Gauthier | F02C 7/228 60/773 |
| 2011/0270502 A1 * | 11/2011 | Demougeot | F02C 7/224 701/100 |
| 2011/0270503 A1 * | 11/2011 | Stuttaford | F02C 7/1435 701/100 |
| 2011/0286563 A1 * | 11/2011 | Moses | G21B 1/01 376/146 |
| 2012/0023953 A1 * | 2/2012 | Thomas | F02C 7/228 60/772 |
| 2012/0070266 A1 * | 3/2012 | Schaberg | F01D 21/12 415/1 |
| 2012/0185144 A1 * | 7/2012 | Draper | F01K 13/02 701/100 |
| 2012/0227389 A1 * | 9/2012 | Hinderks | F01B 1/10 60/317 |
| 2013/0066615 A1 | 3/2013 | Morgan et al. | |
| 2013/0073170 A1 | 3/2013 | Drohan et al. | |
| 2013/0312384 A1 * | 11/2013 | Hwang | C01B 3/382 60/39.12 |
| 2014/0020400 A1 * | 1/2014 | Ceccherini | F02C 9/54 60/773 |
| 2014/0121935 A1 * | 5/2014 | Zhang | F02C 9/00 701/100 |
| 2014/0200721 A1 * | 7/2014 | Rizkalla | F02C 7/228 700/282 |
| 2014/0277789 A1 * | 9/2014 | Stuttaford | G05B 15/02 700/287 |
| 2014/0283527 A1 * | 9/2014 | Ling | F02C 9/42 60/793 |
| 2015/0142188 A1 | 5/2015 | Terry et al. | |
| 2015/0159563 A1 * | 6/2015 | Soni | F02C 9/34 60/773 |
| 2015/0185716 A1 | 7/2015 | Wichmann et al. | |
| 2015/0322857 A1 * | 11/2015 | Ethier | F02C 7/264 290/2 |
| 2016/0084169 A1 * | 3/2016 | Stuttaford | F23R 3/343 60/776 |

OTHER PUBLICATIONS

Aleiferis, P.G.; Hardalupas, Y.; Taylor, A.M.K.P.; Ishii, K. and Urata, Y., "Flame Chemiluminescence Studies of Cyclic Combustion Variations and Air-to-Fuel Ratio of the Reacting Mixture in a Lean-Burn Stratified-Charge Spark-Ignition Engine", Apr. 3, 2003, Combustion and Flame, 136, 72-90.*
Drake, M.C. and Haworth, D.C., "Advanced Gasoline Engine Development Using Optical Diagnostics and Numerical Modeling", 2006, Proceedings of the Combustion Institute, 31, 99-124.*
Drake, M.C.; Fansler, T.D. and Lippert, A.M., Stratified-Charge Combustion: Modeling and Imaging of a Spray-Guided Direct-Injection Spark-Ignition Engine, 2004, Proceedings of the Combustion Institute, 30, 2683-2691.*
Stojkovic, B.D.; Fansler, T.D.; Drake, M.C. and Sick, V., "High-Speed Imaging of OH and Soot Temperature and Concentration in a Stratified-Charge Direct-Injection Gasoline Engine", 2004, Proceedings of the Combustion Institute, 30, 2657-2665.*
Non-Final Office Action dated Aug. 31, 2015 in U.S. Appl. No. 14/213,263, 12 pages.
Notice of Allowance dated Dec. 18, 2015 in U.S. Appl. No. 14/213,263, 5 pages.

* cited by examiner

US 9,765,702 B2

ENSURING NON-EXCESSIVE VARIATION OF GRADIENTS IN AUTO-TUNING A GAS TURBINE ENGINE

CROSS-REFERENCE TO RELATED APPLICATIONS

This application claims priority to U.S. Provisional Application Ser. No. 61/790,161, filed Mar. 15, 2013, entitled "Dynamic Auto-Tuning of a Gas Turbine Engine," and is incorporated by reference herein in its entirety.

BACKGROUND OF THE INVENTION

Gas turbine engines operate to produce mechanical work or thrust. Specifically, land-based gas turbine engines typically have a generator coupled thereto for the purposes of generating electricity. The shaft of the gas turbine engine is coupled to the generator. Mechanical energy of the shaft is used to drive a generator to supply electricity to at least a power grid. The generator is in communication with one or more elements of a power grid through a main breaker. When the main breaker is closed, electrical current can flow from the generator to the power grid when there is a demand for the electricity. The drawing of electrical current from the generator causes a load to be applied to the gas turbine. This load is essentially a resistance applied to the generator that the gas turbine must overcome to maintain an electrical output of the generator.

SUMMARY

Increasingly, a control system is used to regulate the operation of the gas turbine engine. In operation, the control system receives a plurality of indications that communicate the current operating conditions of the gas turbine engine including pressures, temperatures, fuel-flow rates, and engine frequencies. In response, the control system makes adjustments to the inputs of the gas turbine engine, thereby changing performance of the gas turbine engine. Over time, this performance may fall outside a preferred operating range due to mechanical degradation of the gas turbine engine or changes in operational conditions such as ambient temperature or fuel constituents. For instance, the gas turbine engine may start operating beyond regulated emissions limits. As such, multiple manual tunings are required to update the control system. Manual tuning is labor intensive and can create business-related inefficiencies, such as extended down-time of the gas turbine engine and operator error in the course of tuning. In addition, because there are specific windows of time where manual tuning may not be available (e.g., high dynamics events), but where performing a tuning operation would be beneficial to protect against potential damage to hardware, automatically tuning during those window will capture those benefits typically missed with manual tuning.

Initially, various engine operating conditions can be monitored. By way of example, these operating conditions may include, but are not limited to, emissions, and combustor dynamics modes, such as Lean Blow Out (LBO), Cold Tone (CT), Hot Tone (HT), and Screech. When a monitored operating condition exceeds one or more of the predetermined upper or lower limits, an engine parameter is changed to adjust this condition to bring it within the limits, thereby "tuning" the gas turbine engine. Generally, a tuned engine functions within an efficient range of operating conditions.

Embodiments of the present invention provide for a determination to be made as to whether a particular bias is to be performed. For instance, a split schedule can be utilized to perform calculations that ultimately provide guidance on whether a bias in a particular direction should be taken. A split schedule and an applied schedule, for example, may be plotted onto a graph that illustrates a split percentage against firing temperature of the gas turbine engine. While in one embodiment the firing temperature is used on the x-axis of a graph, in an alternative embodiment, relative load (e.g., relative to the baseload) is used. While firing temperature is used in much of the description herein, it should be noted that relative load or simply load may be used as well, and is contemplated to be within the scope of the present invention.

The applied split includes the split schedule value at each plotted point plus a bias, which may be a higher split percentage or a lower split percentage than the split schedule. Before an incremental split bias adjustment is made using an automated tuning system (e.g., AutoTune), it may be determined whether that bias can be made based on one or more conditions or calculations. While the term AutoTune is used herein, this is not meant to limit embodiments of the present invention. Other tuning systems not specifically mentioned herein may be used. During automated tuning of a gas turbine combustion system, the variation of gradient of an applied split schedule can become excessive as a result of automated incremental split bias adjustments. An incremental split bias adjustment, as used herein, is a small adjustment made to a parameter of the GT engine, such as here, the split percentage. The adjustment is made in small increments so as not to cause the system to become unstable. This would likely cause one or more operating parameters to be out of a normal range. Excessive difference in gradient between adjacent points of a split schedule can lead to unpredictable and undesirable engine behavior. Existing solutions typically involve curve fitting the discrete points of a split schedule and adjusting the curve fit to prevent the derivatives of the fitted function from exceeding specified limits.

Generally, the system and methods described herein are used to upgrade the capability of an AutoTune system to ensure that the variation of gradient of applied split bias versus firing temperature or load does not become excessive during automated tuning of a gas turbine combustion system. An array of breakpoints of applied split bias versus firing temperature or load is referred to as an applied split schedule. The variation of gradient of applied split bias refers to the difference between the slope on the left and the slope on the right of a breakpoint of the applied schedule. Embodiments of the present invention have been programmed into a PSM AutoTune system for a GE 7FA engine with DLN 2.6 combustion system. For proper operation of this combustion system, the PM1, PM3, and Quat schedules are such that the fuel splits gradually or smoothly change with increasing firing temperature.

In one embodiment, and as will be described in further detail herein, in order to determine whether an incremental split bias adjustment can be performed, a gradient between the two plotted points to the left of the current position on the curves (at the current firing temperature) is calculated, as well as a gradient between the two plotted points to the right of the current position on the curves. The left of the current position refers to firing temperatures that are lower than the current firing temperature, and the right of the current position refers to firing temperatures that are higher than the current firing temperature. For both the two plotted points on the left and the right, a gradient is calculated for both the split bias curve and the applied split bias curve. The difference between the gradients of the applied split bias curve and the split curve for both the left and right plotted points is calculated. If this value is above a predetermined threshold or limit, the incremental split bias adjustment is not made in that particular direction. As such, if the gradient difference for the two nearest plotted points to the left of the current firing temperature (lower firing temperatures) is within the predetermined limit, the incremental split bias adjustment can be made for the lower firing temperature. The same determination is made for the two plotted points to the right of and nearest to the current firing temperature.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

As one skilled in the art will appreciate, embodiments of the present invention may be embodied as, among other things, a method, a system, or a computer-program product. Accordingly, the embodiments may take the form of a hardware embodiment, a software embodiment, or an embodiment combining software and hardware. In one instance, embodiments of the present invention take the form of the computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVDs), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
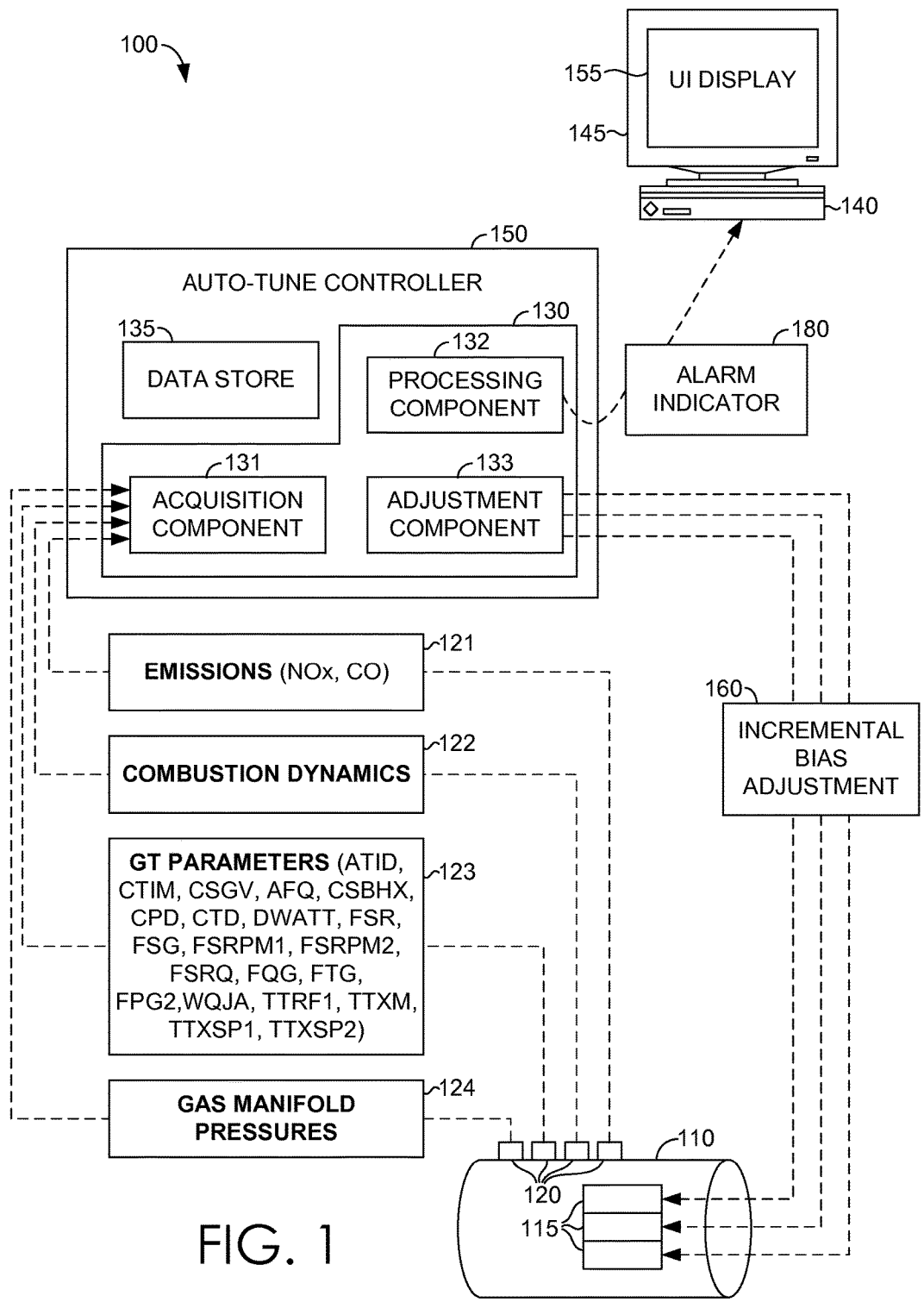
FIG. 1 is a block diagram of an exemplary tuning environment suitable for use in embodiments of the present invention.

As described above, embodiments of the present invention generally relate to automatically tuning a gas turbine engine in a dynamic fashion, and in particular, determining whether a particular incremental split bias adjustment can be made in either direction. With reference to FIG. 1, a gas turbine engine 110 is depicted that accommodates a plurality of combustors 115. Generally, for the purpose of discussion, the gas turbine (GT) engine 110 may include any low emission combustors. In one instance, these low emission combustors may be arranged in a can-annular configuration about the GT engine 110. One type of GT engine (e.g., heavy duty GT engines) may be typically provided with, but not limited to, 6 to 18 individual combustions, each of them fitted with a combustor liner, end cover, and casings. Another type of GT engine (e.g., light duty GT engines) may be provided with fewer combustors. Accordingly, based on the type of GT engine, there may be several different fuel circuits utilized for operating the GT engine 110. Further, there may be individual fuel circuits that correspond with each of the plurality of combustors 115 attached to the GT engine 110. As such, it should be appreciated and understood that the auto-tune controller 150, and the tuning process executed thereby, can be applied to any number of configurations of GT engines and that the type of GT engines describe herein below should not be construed as limiting on the scope of the present invention.

As discussed above, the plurality of combustors 115 (e.g., low emission combustors) may be prone to elevated levels of pressure fluctuation within the combustor liner. These pressure fluctuations are referred to as "combustion dynamics." Left alone, combustion dynamics can have a dramatic impact on the integrity and life of the plurality of combustors 115, eventually leading to catastrophic failure.

Further, when outside an optimal operating range, the GT engine 110 may emit emissions with properties that are unacceptable (i.e., exceed a predefined threshold). In embodiments, these properties of the GT engine 110 emissions may include "emission composition," which is measure periodically by a monitoring device (e.g., continuous emission monitoring system (CEMS)). By way of example, the emission composition may be measured in units of parts per million (ppm) for each of NOx and CO, while 02 may be measured in percent (%) composition. As such, "emission compositions" relate to the amount of pollutant that is generated by the GT engine 110. Once the emission composition is measured, it is compared against a critical (maximum/minimum) value to determine whether the emission composition is actually acceptable.

These effects of elevated combustion dynamics and/or unacceptable emission compositions may be mitigated or cured by adjusting fuel-flow splits of the combustor gas flow between several groups of nozzles within the plurality of combustors 115. Generally, a fuel-flow split is commonly adjusted for each of the plurality of combustors 115; thus, the combustors (burners) are tuned alike, as opposed to tuning at the individual burner level. These different "fuel-flow splits" are occasionally tuned to ensure that acceptable levels (conventionally low levels) of the combustion dynamics are maintained while, at the same time, promoting acceptable emission compositions.

Schedules that govern which fuel-flow split will be adjusted for each fuel circuitare typically hard coded into a control system (not shown) of GT engine 110. In one instance, these schedules are a function of a reference that could be, amongst other things, a turbine inlet reference temperature (TTRF) or a user-defined/specific load on the GT engine 110. Over time, several parameters will affect the combustion dynamics. In particular, ambient condition changes and/or gas composition variation and/or normal wear may degrade the operation of the GT engine. This degradation leads to regular "re-tuning" of the combustor to maintain combustion dynamics and emission composition within acceptable limits.

As such, in one embodiment, one or more computer-readable media are provided that, when invoked by computer-executable instructions, perform a method for ensuring non-excessive variation of a gradient of an applied split bias versus firing temperature of a GT engine. The method includes determining that an incremental split bias step is to be taken during automatic tuning of the GT engine, identifying a current firing temperature of the GT engine on a graph that plots a firing temperature versus a percentage of split, and calculating a first difference between a split schedule gradient and an applied split schedule gradient. Each of the split schedule gradient and the applied split schedule gradient is calculated using plotted points on a split schedule curve or on an applied split schedule curve that correspond to lower firing temperatures than the current firing temperature. The method also includes calculating a second difference between the split schedule gradient and the applied split schedule gradient. Each of the split schedule gradient and the applied split schedule gradient is calculated using plotted points on the split schedule curve or on the applied split schedule curve that correspond to higher firing temperatures than the current firing temperature. If the first difference exceeds a predetermined limit, an incremental split bias step is not allowed to be taken at a lower firing temperature that is lower than the current firing temperature, and if the second difference exceeds a predetermined limit, the incremental split bias step is not allowed to be taken at a higher firing temperature that is higher than the current firing temperature.

In another embodiment, a method performed by a computing device having a processor and memory, the method for ensuring non-excessive variation of a gradient of an applied split bias versus firing temperature of a GT engine. The method includes determining that an incremental split bias step is desired during automatic tuning of the GT engine, identifying a current firing temperature of the GT engine on a graph that plots a firing temperature versus a percentage of split, and determining that a margin is unavailable for a first direction incremental split bias step associated with a split bias in a first direction but that the margin is available for a second direction incremental split bias step associated with a split bias in a second direction. The first direction and the second direction correspond to higher temperatures or lower temperatures on the graph than the current firing temperature. The method additionally includes calculating a first difference between a split schedule gradient and an applied split schedule gradient using plotted points on a split schedule curve and an applied split schedule curve corresponding to the second direction, and calculating a second difference between the split schedule gradient and the applied split schedule gradient using plotted points on the split schedule curve and the applied split schedule curve that are directly adjacent and that are on both sides to points corresponding to the current firing temperature. If at least one of the first difference or the second difference exceeds a predetermined limit, an incremental split bias step is not allowed to be taken in the direction.

In still another embodiment, one or more computer-readable media are provided that, when invoked by computer-executable instructions, perform a method for ensuring non-excessive variation of a gradient of an applied split bias versus firing temperature of a GT engine. The method includes determining that an incremental split bias step is to be taken during automatic tuning of the GT engine, and identifying a current firing temperature of the GT engine on a graph that plots a firing temperature versus a percentage of split. The resulting curves are a split schedule curve whose plotted points are set by a manual tuner and an applied split schedule curve that includes the split schedule plus bias for each point on the curve. The method also includes determining whether there is available margin at one or more points on the split schedule curve directly adjustment to points corresponding to the current firing temperature, calculating a first split schedule gradient between two points on the split schedule curve that represent lower firing temperatures than the current firing temperature, and calculating a first applied split schedule gradient between two points on the applied split schedule curve that represent the lower firing temperatures than the current firing temperature. Further, the method includes determining a first difference between the first applied split schedule gradient and the first split schedule gradient, calculating a second split schedule gradient between two points on the split schedule curve that represent higher firing temperatures than the current firing temperature, and calculating a second applied split schedule gradient between two points on the applied split schedule curve that represent the higher firing temperatures than the current firing temperature. Even further, the method includes determining a second difference between the second applied split schedule gradient and the second split schedule gradient, and determining whether to take the incremental split bias step. If the first difference exceeds a predetermined limit, the incremental split bias step is not allowed to be taken in a direction associated with the lower firing temperatures. If the second difference exceeds a predetermined limit, the incremental split bias step is not allowed to be taken in a direction associated with the higher firing temperatures.

As discussed herein, a control system for carrying out automated tuning, or the auto-tune controller 150 of FIG. 1, is used to assess the state of the GT engine 110 and the plurality of combustors 115 in terms of parameters such as the combustion dynamics, air flow, fuel-flows, emissions, and pressure distribution. Based on those parameters, the adequate fuel-flow splits are selected and are adjusted incrementally until the alarm has been cleared. Typically, the alarm is set upon detecting that an amplitude of a pressure pulse surpasses a predetermined upper or lower limit and/or upon recognizing that the composition of the combustor emissions has exceeded a particular critical value. Accordingly, embodiments of the present invention concern the auto-tune controller 150, as well as the associated tuning process, that enables automatic tuning of the combustion dynamics and emissions using small, consistent incremental changes of a dynamically selected fuel-flow split (e.g., selected by employing the schedules discussed hereinbelow).

An overall tuning process carried out by the auto-tune controller 150 may comprise one or more of the steps described immediately below. Initially, in one embodiment, various configurations of pressure signals and emissions compositions of the plurality of combustors 115 are monitored and recorded. These recorded pressure signals may be passed through a Fourier Transform or another transformative operation, where the pressure signals are converted into an amplitude versus frequency data format or spectrum. The values of the emissions compositions are also read and maintained. The amplitude, values, and frequencies are then compared against a predetermined upper or lower limit for each predefined frequency band, while the emission-composition parameters are compared against predefined critical values. The predetermined limit is generally defined in terms of pounds per square inch (psi) for predefined frequency bands, while the critical values are defined in terms of parts per million (ppm) or percentage. However, in other instances, the predetermined limits and critical values may be expressed in other terms or units, where other types are devices are used to measure performance of the combustors 115 (e.g., accelerometers). If the determination is made that one of the frequency-based amplitudes exceeds its respective predetermined limit(s) for a predetermined frequency band, or one or more gases comprising the emission composition surpasses its respective critical values, then the auto-tune controller 150 dynamically selects a fuel-flow split to adjust and then adjusts the selected fuel-flow split a single time at a predefined amount.

Once the single, fuel-flow split adjustment is made, the process reiterates. That is, the steps of (a) monitoring and comparing the amplitude for a number of predetermined frequency bands to the predetermined limits, (b) selecting a fuel-flow split using the schedules, and (c) making an incremental adjustment to the selected fuel-flow split are repeated if the dynamic pressure amplitude surpasses the predetermined limit(s). As such, in instances, when the dynamic pressure amplitude is ascertained to surpass the predetermined limit(s), a predetermined adjustment may be made to the previously selected fuel-flow split or a different fuel-flow split, upon employing the schedule.

With continued reference to FIG. 1, an exemplary embodiment of the tuning process will now be described in detail. Initially, FIG. 1 illustrates an exemplary tuning environment 100 suitable for use in embodiments of the present invention. The exemplary tuning environment 100 includes the auto-tune controller 150, a computing device 140, and the GT engine 110. The auto-tune controller 100 includes a data store 135 and a processing unit 130 that supports the execution of the acquisition component 131, the processing component 132, and the adjustment component 133. Generally, the processing unit 130 is embodied as some form of a computing unit (e.g., central processing unit, microprocessor, etc.) to support operations of the component(s) 131, 132, and 133 running thereon. As utilized herein, the phrase "processing unit" generally refers to a dedicated computing device with processing power and storage memory, which supports operating software that underlies the execution of software, applications, and computer programs thereon. In one instance, the processing unit 130 is configured with tangible hardware elements, or machines, that are integral, or operably coupled, to a computer. In another instance, the processing unit may encompass a processor (not shown) coupled to the computer-readable medium. Generally, the computer-readable medium stores, at least temporarily, a plurality of computer software components that are executable by a processor. As utilized herein, the term "processor" is not meant to be limiting and may encompass any elements of the processing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

In addition, the auto-tune controller 100 is provided with the data store 135. Generally, the data store 135 is configured to store information associated with the tuning process or data generated upon monitoring the GT engine 100. In various embodiments, such information may include, without limitation, measurement data (e.g., measurements 121, 122, 123, and 124) provided by sensors 120 coupled to the GT engine 110. In addition, the data store 135 may be configured to be searchable for suitable access of stored information. For instance, the data store 135 may be searchable for dynamic schedules in order to determine which fuel-flow split to increment upon comparing the measured dynamic pressure amplitudes to corresponding predetermined limit(s) and upon comparing the measured emissions compositions to corresponding critical values, respectively. It will be understood and appreciated that the information stored in the data store 135 may be configurable and may include any information relevant to the tuning process. The content and volume of such information are not intended to limit the scope of embodiments of the present invention.

Figure 2:
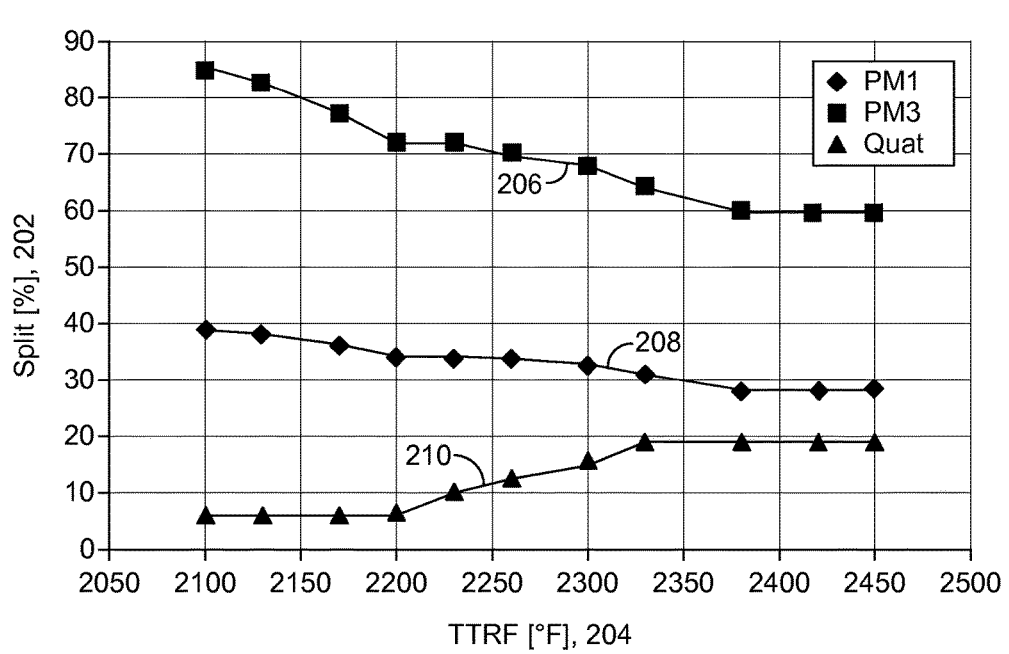
FIG. 2 is an example of split schedules for various circuits of a can of a gas turbine engine, in accordance with an embodiment of the present invention.

FIG. 2 is an example of split schedules for various circuits of a can of a GT engine, in accordance with an embodiment of the present invention. As mentioned, algorithms may be used to smooth a split schedule so that the curve representing the split schedule does not have any extreme variations. FIG. 2 illustrates an exemplary split table 200. The plotted points, in one embodiment, are set by a human tuner. The y-axis represents split percentage 202, while the x-axis represents firing temperature 204 of the GT engine. A quat, in embodiments, is a fuel circuit in a particular can of the turbine, and comprises one or more circuits. The individual circuits in the embodiment of FIG. 2 are termed PM1, PM2, and PM3, and are each set by a special valve. The fuel fractions of PM1, PM2, and PM3 can be manipulated by adjusting the split between them. The total amount of fuel remains constant, but the splits are adjusted where the fuel is injected. There may be one or more nozzles for each fuel fraction. For instance, increasing the split % of PM3 takes fuel away from PM1 and PM2. All cans in a combustor have the same nozzles. If the split is adjusted in PM3, for example, the fuel adjustment may be made to every can in the combustor, not just one can. As used herein, a split is the fuel fraction across various fuel circuits.

Each curve on the graph of the split table 200 represents a different fuel fraction. For instance, one is for PM1 206, another is for PM3 208, and still another is the quat 210. In one embodiment, the plotted points shown in FIG. 2 are set at commissioning of the GT engine and are left alone (e.g., not changed by AutoTune).

Figure 3:
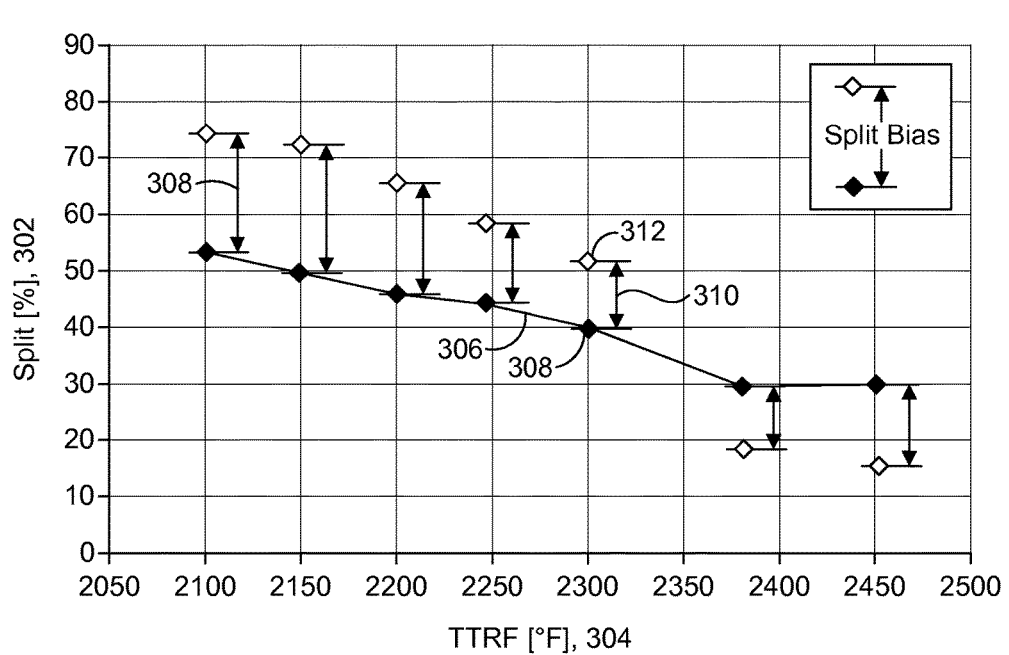
FIG. 3 is an illustrative split schedule with bias, in accordance with an embodiment of the present invention.

Turning now to FIG. 3, an illustrative split schedule with bias 300 is depicted, in accordance with an embodiment of the present invention. In one instance, the graph illustrated in FIG. 2 is biased to produce the graph illustrated in FIG. 3. As used herein, the split bias is the delta or change from the original point. The bias amount is stored. For example, at particular ambient conditions, with a firing temperature of 2300° F., the split ratio is set to 40%. This is shown at plotted point 308. When AutoTune is used (e.g., when the combustor is automatically tuned), the system may not be at a 40% split, but may instead be at a 51% split with the included bias, shown at plotted point 312, with item 310 representing the split bias at this firing temperature. From 40%, the system automatically tunes the system up to the split bias, or here, 51%. For example, the system may incrementally adjust the split while monitoring operating conditions and other monitored parameters, as previously discussed. In embodiments, a jump from 40% to 51% is not made at once, as this could cause the operation of the GT engine to become unstable. As such, various parameters are monitored to ensure the system remains stable.

Once 51% is reached, the system does not continue to incrementally adjust the split. These split bias values are stored in split bias tables to be accessed at a later time. As such, next time the engine is at that same load at those same or similar ambient conditions, that load or split will be applied automatically. If something else has changed and the split may not be the same, the stored split may be used as the starting point to determine the optimal split bias for that particular time. As shown, for each plotted point, there is a stored split bias, which could either be at a higher split percentage or a lower split percentage.

When AutoTune is initially utilized for a particular engine, there is no bias. As AutoTune starts learning the machine, it learns these biases and starts tuning to acceptable conditions and stores these values when fully tuned.

Figure 4:
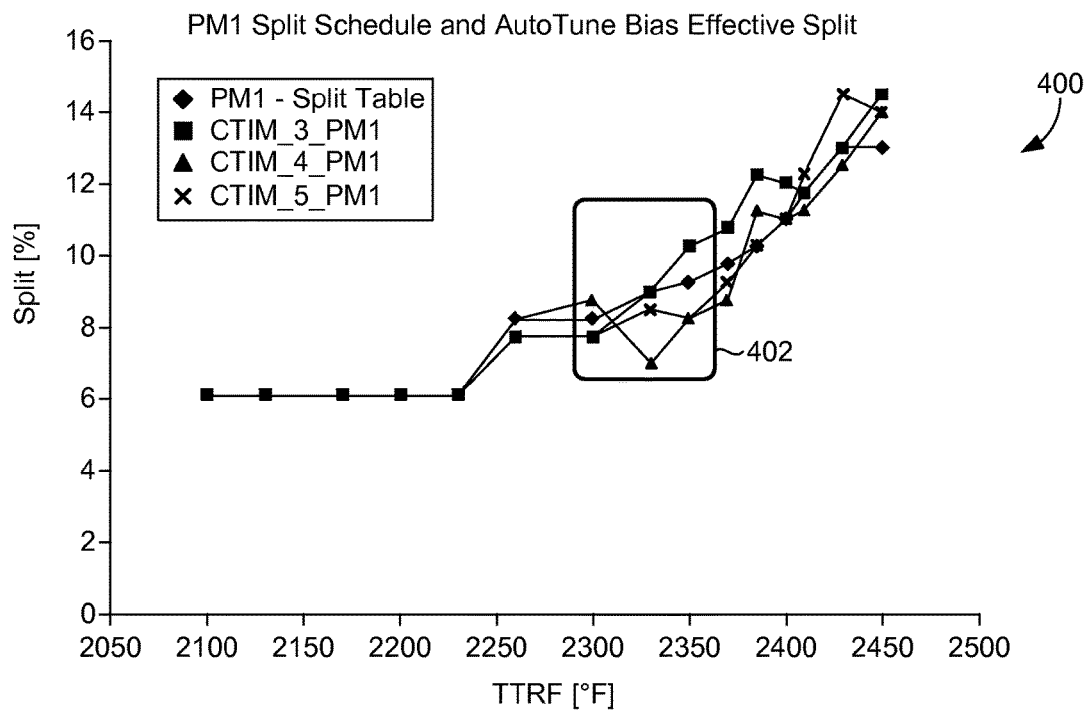
FIG. 4 is an exemplary split schedule and tuning system bias effective split, in accordance with an embodiment of the present invention.
Figure 5:
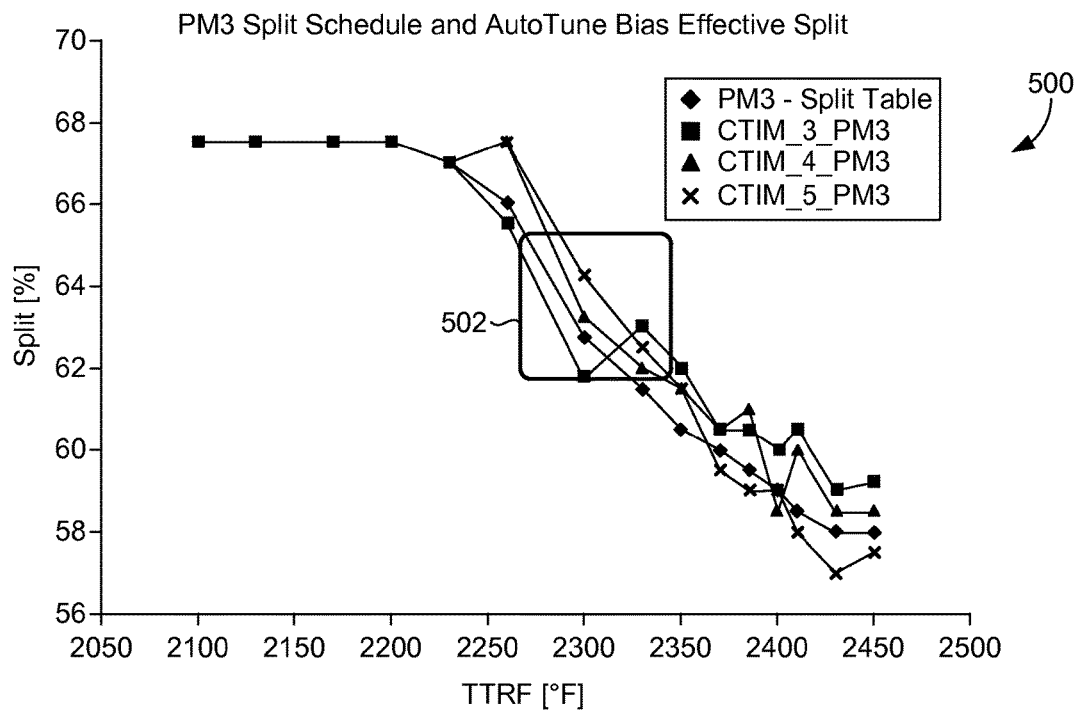
FIG. 5 is another exemplary split schedule and tuning system bias effective split, in accordance with an embodiment of the present invention.
Figure 6:
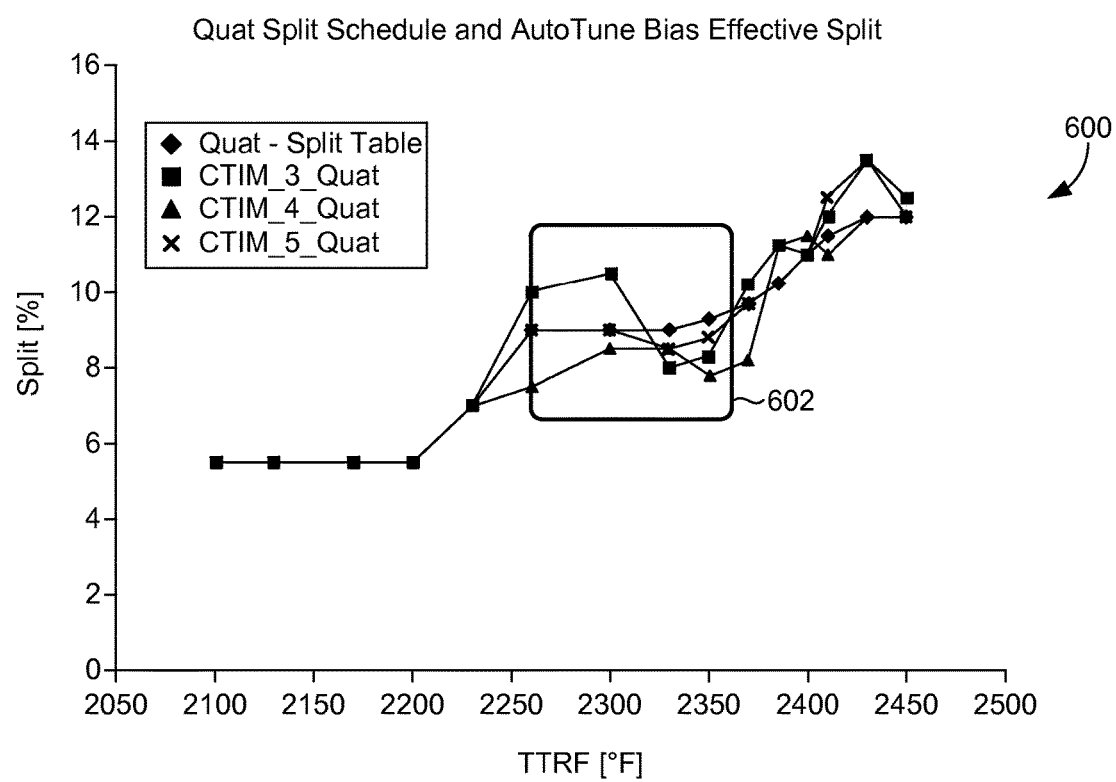
FIG. 6 is another exemplary split schedule and tuning system bias effective split, in accordance with an embodiment of the present invention.

FIGS. 4, 5, and 6 are exemplary split schedules and tuning system bias effective splits (graphs 400, 500, and 600, respectively), in accordance with embodiments of the present invention. Here, split tables of PM1, PM3, and Quat are illustrated for exemplary purposes only. There are three different curves on each plot for three different ambient conditions. The portions of each graph that are outlined, items 402, 502, and 602, respectively, are portions that have jagged areas, or that are less smooth than other areas of the graph (items 400, 500, and 600 respectively). For instance, CTIM 3 represents a temperature of 60° F., CTIM 4 represents 80° F., while CTIM 5 represents 100° F. These plots illustrate the value of the split plus the value of the bias added to it. This is the total value, or what is going to the valve as a result of using AutoTune to automatically tune the system. Sometimes, AutoTune goes from one curve to the next, but there may be some issues because of the delta or change between the curves. The idea is to smooth out the curves to make the curves less jagged, or make them smooth. The jagged areas (e.g., graph portions 402, 502, and 602) are where there is a big step in the split, and embodiments of the present invention aim to avoid these jagged jumps.

Figure 7:
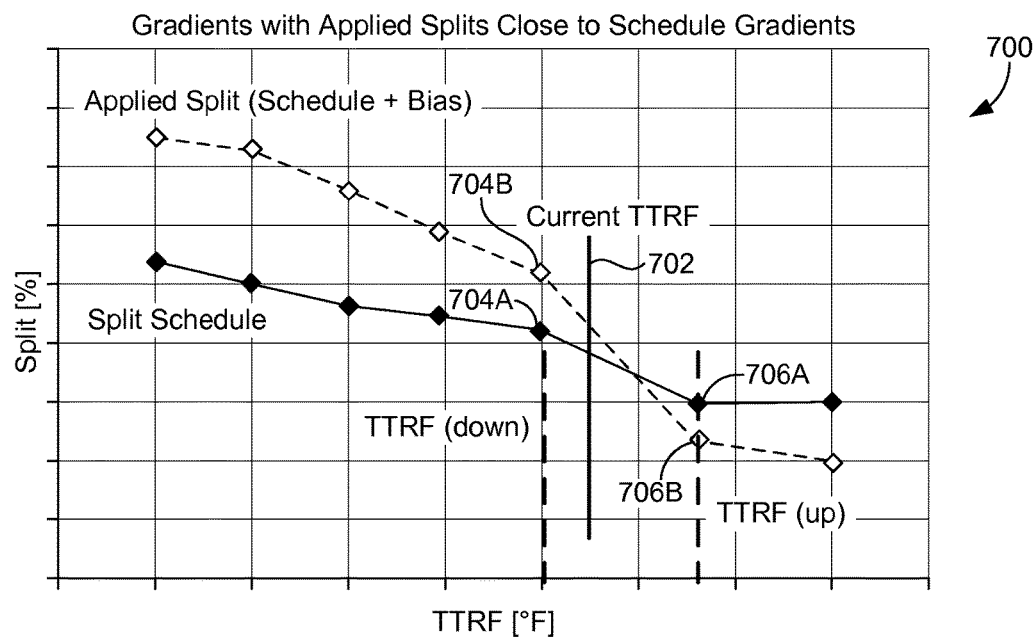
FIG. 7 illustrates a split schedule curve and an applied split schedule curve having small gradient differences, in accordance with an embodiment of the present invention.

One way to protect against jagged jumps in the curves is to look at the original split schedule shown in FIG. 2, and look at the TTRF(down) (lower firing temperature) and the TTRF(up) (higher firing temperature). This is shown in FIG. 7. FIG. 7 is a graph 700 that illustrates a split schedule curve and an applied split schedule curve having small gradient differences, in accordance with an embodiment of the present invention.

Initially, the point on each of the split schedule and applied split schedule curves are located at the current firing temperature. Here, those points are located on line 702, corresponding to the current firing temperature. The slope of the line between TTRF(down) (split schedule plotted point 704a and applied split schedule plotted point 704b) and TTRF(up) (split schedule plotted point 706a and applied split schedule plotted point 706b) is calculated. Here, the slope is going down, or decreasing. $((y2-y1)/(x2-x1))$ is the typical slope calculation. In one embodiment, the plotted points used are those directly adjacent to or those that are nearest to the current firing temperature. For instance, plotted points 704a and 704b represent the nearest plotted points having a lower firing temperature than the current firing temperature, while plotted points 706a and 706b represent the nearest plotted points having a higher firing temperature than the current firing temperature. Here, the gradients of the split schedule and the applied split schedule curves are close, or similar.

Figure 8:
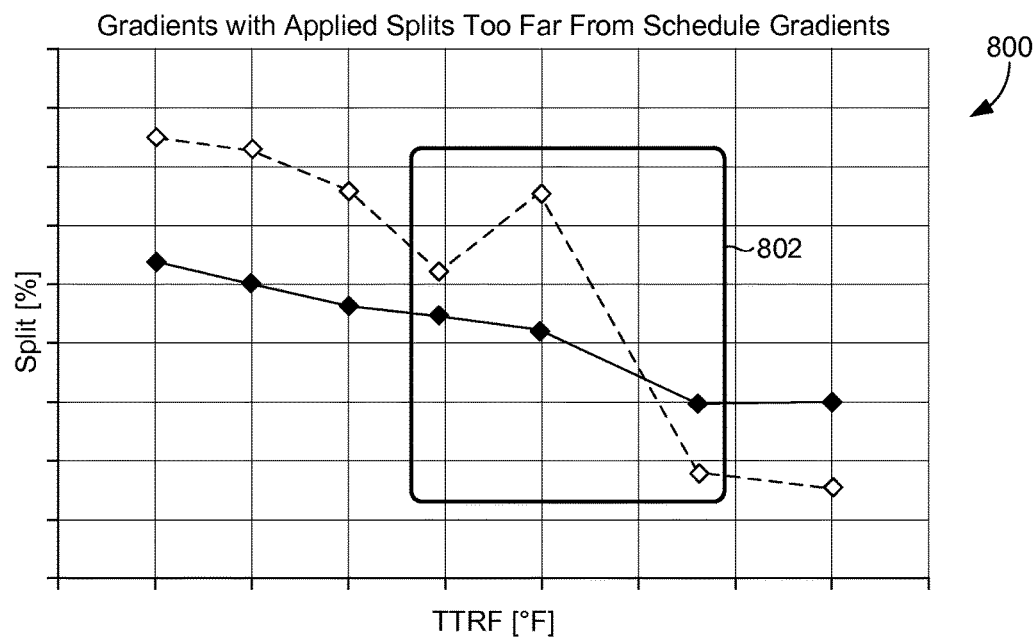
FIG. 8 illustrates a split schedule curve and an applied split schedule curve having large gradient differences, in accordance with an embodiment of the present invention.

However, in other cases, such as the curves shown in the graph 800 of FIG. 8, the gradients of the split schedule and the applied split schedule are too far apart. Enclosed area 802 illustrates the portion of the graph 800 where if the differences in slopes of the split schedule and the applied split schedule curves were calculated between the plotted points, the value of the difference would likely exceed a predetermined threshold or limit. If it exceeds the predetermined limit, the system determines that it is unacceptable to take the incremental split bias adjustment.

For FIGS. 7 and 8, the gradient of the lines shown is calculated as follows. The applied split gradient is equal to [Applied Split(up)−Applied Split(down)]/[TTRF(up)−TTRF(down)], while the manual split gradient is equal to [Manual Split(up)−Manual Split(down)]/[TTRF(up)−TTRF (down)]. The difference between these gradients is determined for further analysis. For instance, the difference between the applied and the manual split gradient needs to be less than a user-defined limit. This provides for slight variation, but not too much variation from the split schedule stored in the engine, or the split schedule set by a manual tuner.

When this is invoked, this limits what AutoTune is about to do, not what it has previously done. It does not smooth out a curve that was previously there, but it will prevent the system from taking a next step that would set the applied split curve in the wrong direction. The system knows, before it takes a next step, if it can take that step, or whether that step needs to be adjusted. Embodiments of the present invention set the criteria or a limitation as to what AutoTune can do step wise. Using this process eventually provides for a smoother curve.

Figure 9:
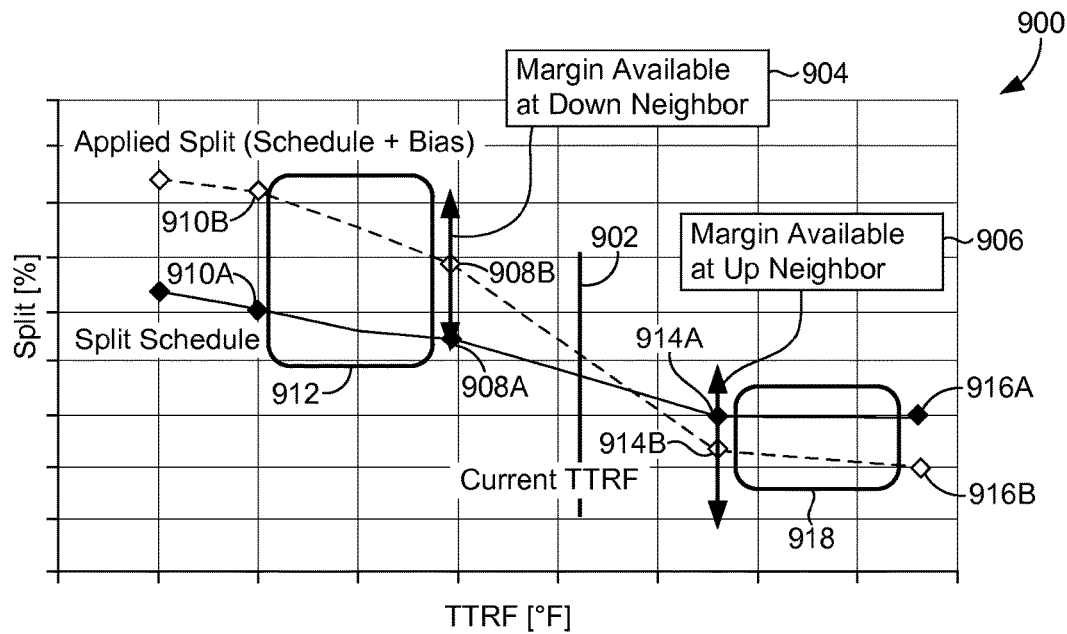
FIG. 9 illustrates a first case having tuning margin available for both neighboring firing temperature breakpoints, in accordance with an embodiment of the present invention.

FIG. 9 illustrates a first case having tuning margin available for both neighboring firing temperature breakpoints, in accordance with an embodiment of the present invention. In FIG. 9, a graph 900 is illustrated having a split schedule curve and an applied split schedule curve. As shown, line 902 represents the current TTRF, or firing temperature of the GT engine. If the current TTRF, or load point, is between two points, the system will calculate the margins of the two nearest points (one above and one below) to determine whether margin is available at each of those nearest points. If both points have enough or available margin, as shown at item s 904 and 906, both points will be moved, such as is the case in FIG. 9.

Additionally, FIG. 9 illustrates between which points the gradients are calculated by way of the outlined portions 912 and 918. For instance, for the lower firing temperature points, the system uses plotted points 910a and 908a to calculate the gradient of the split schedule curve at the lower firing temperatures, and uses plotted points 910b and 908b to calculate the gradient of the applied split schedule curve at the lower firing temperatures. Likewise, the system uses plotted points 914a and 916a to calculate the gradient of the split schedule curve at the higher firing temperatures, and uses plotted points 914b and 916b to calculate the gradient of the applied split schedule curve at the higher firing temperatures. Once gradients are calculated, the difference between the lower applied split schedule gradient and the lower split schedule gradient is calculated ("lower difference"), in addition to the difference between the higher applied split schedule gradient and the higher split schedule gradient ("higher difference"). If the lower difference exceeds a predetermined limit (outside of a user-defined range), the bias is not taken in that particular direction, which here is toward lower firing temperatures. Similarly, if the higher difference exceeds a predetermined limit (outside of a user-defined range), the bias is not taken in that particular direction, which here is toward higher firing temperatures. As such, if moving the bias at both neighbors causes either difference in gradients to exceed the limit, then AutoTune will try to only move one bias.

Figure 10:
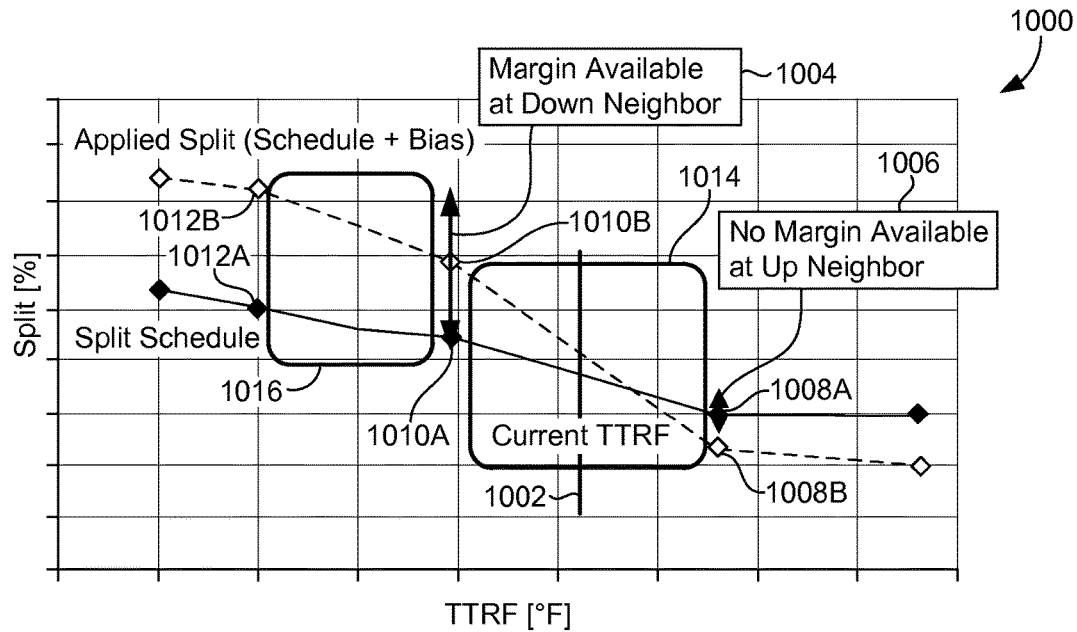
FIG. 10 illustrates a first case having tuning margin available at only the down neighboring firing temperature breakpoint, in accordance with an embodiment of the present invention.

FIG. 10 illustrates a second case having tuning margin available at only the down neighboring firing temperature breakpoint, in accordance with an embodiment of the present invention. Here, a graph 1000 is shown again having a split schedule curve and an applied split schedule curve. As previously mentioned, margin is first calculated so it can be determined if margin is available at each of the nearest plotted points on either side of the current firing temperature. Here, line 1002 represents the current firing temperature. As such, margin is examined at plotted points 1008a/1008b (higher firing temperature) and 1010a/1010b (lower firing temperature). In this particular case, it is determined that margin is available at the down neighbor (plotted point directly to the left of the current firing temperature), shown as item 1004, and that margin is not available at the up neighbor (plotted point directly to the right of the current firing temperature), shown as item 1006. Because margin is not available at the up neighbor (having a higher firing temperature than the current firing temperature), the gradient of the split schedule and applied split schedule curves is not calculated between plotted points associated with higher firing temperatures. As used herein, margin is available when moving the bias would not cause the applied bias or applied split to go past a predetermined value. As such, margin is not available when moving the bias would cause the applied bias or applied split to go past a predetermined value.

Instead, the gradient of the split schedule and applied split schedule curves is calculated between plotted points associated with lower firing temperatures, as margin is available. As explained in relation to FIG. 9 above, the gradient is calculated using plotted points 1012a and 1010a for the split schedule curve, and plotted points 1012b and 1010b for the applied split schedule curve. This area is outlined as area 1016. Additionally, the gradient between the two plotted points immediately above and below (to the left and right) of the point on the curve associated with the current firing temperature is calculated using plotted points 1010a and 1008a for the split schedule curve, and plotted points 1010b and 1008b for the applied split schedule curve. This area is outlined as area 1014. The gradient differences are then calculated. In embodiments, if either of these gradient differences are outside a predetermined limit, the incremental bias step adjustment is not taken in that direction, which here, is in the direction of lower firing temperatures.

Figure 11:
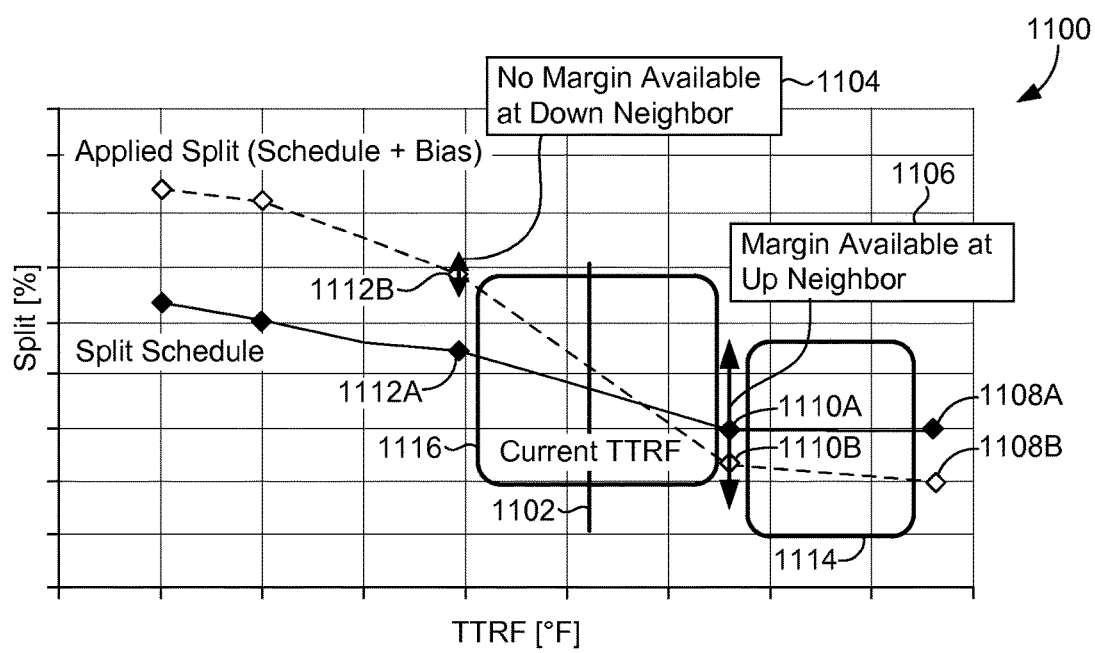
FIG. 11 illustrates a first case having tuning margin available at only the up neighboring firing temperature breakpoint, in accordance with an embodiment of the present invention.

FIG. 11 illustrates a third case having tuning margin available at only the up neighboring firing temperature breakpoint, according to an embodiment of the present invention. This case is similar to that described with respect to FIG. 10, except that here, margin is available at the up neighbor 1106 but not at the down neighbor 1104. In FIG. 11, the current firing temperature is illustrated by line 1102. As such, the gradient is not calculated using plotted points associated with lower firing temperature than the current firing temperature, but instead a gradient is calculated using plotted points (1110a and 1108a for the split schedule curve and 1110b and 1108b for the applied split schedule curve). The difference between these gradients is determined. Additionally, the gradient is calculated between points 1112a and 1110a for the split schedule curve and 1112b and 1110b for the applied split schedule curve. The difference between these gradients is determined. If either of these gradient differences is outside of a predetermined limit, the incremental split bias adjustment is not made in the direction associated with higher firing temperatures.

Figure 12:
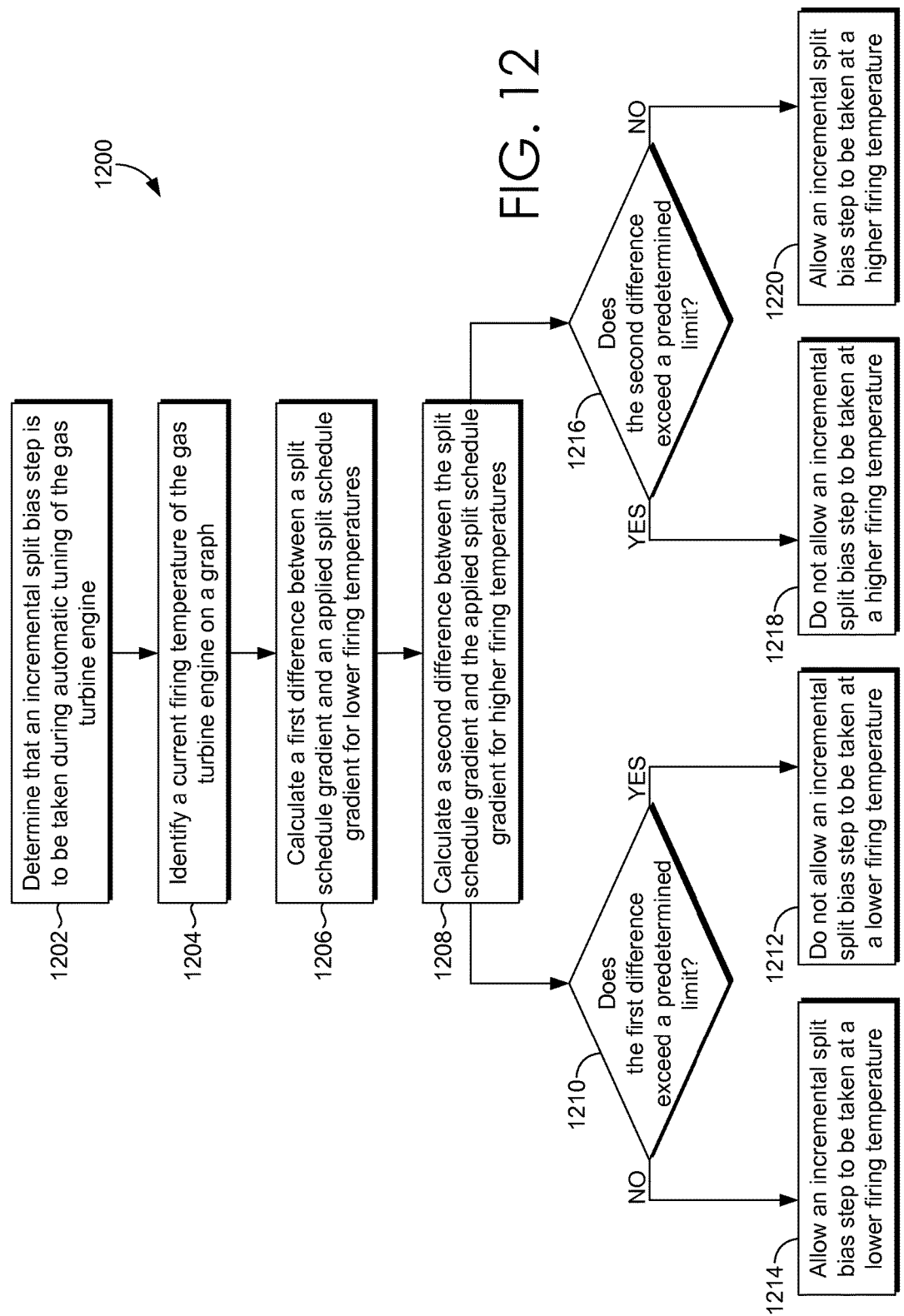
FIG. 12 is an exemplary flow diagram of a method for ensuring non-excessive variation of a gradient of an applied split bias versus firing temperature of a gas turbine engine, in accordance with an embodiment of the present invention.

Referring to FIG. 12, an exemplary flow diagram is depicted of a method 1200 for ensuring non-excessive variation of a gradient of an applied split bias versus firing temperature of a GT engine, in accordance with an embodiment of the present invention. Initially, at step 1202, it is determined that an incremental split bias step is to be taken during automatic tuning of the GT engine. At step 1204, a current firing temperature of the GT engine is identified on a graph. In one embodiment, this graph includes plots of a split schedule and an applied split schedule (split schedule plus a bias).

At step 1206, a first difference between a split schedule gradient and an applied split schedule gradient is calculated for lower firing temperatures, such as firing temperatures that are lower than the current firing temperature. As used herein, a gradient is a slope between two plotted points or any two points on a curve, whether it be the split schedule curve or the applied split schedule curve. In one embodiment, each of the split schedule gradient and the applied split schedule gradient is calculated using plotted points on a split schedule curve or on an applied split schedule curve that correspond to lower firing temperatures than the current firing temperature. In one instance, these plotted points used to calculate the gradients are the ones directly adjacent to or nearest to a point corresponding to the current firing temperature, and more particularly are those that have lower firing temperatures. Further, calculating the first difference comprises calculating a first split schedule gradient between two plotted points on the split schedule curve that represent lower firing temperatures than the current firing temperature, and calculating a first applied split schedule gradient between two plotted points on the applied split schedule curve that represent the lower firing temperatures than the current firing temperature.

At step 1208, a second difference between the split schedule gradient and the applied split schedule gradient is calculated for higher firing temperatures that are higher than the current firing temperature. In one embodiment, each of the split schedule gradient and the applied split schedule gradient is calculated using plotted points on a split schedule curve or on an applied split schedule curve that correspond to higher firing temperatures than the current firing temperature. In one instance, these plotted points used to calculate the gradients are the ones directly adjacent to or nearest to a point corresponding to the current firing temperature, and more particularly are those that have higher firing temperatures. Further, calculating the second difference comprises calculating a second split schedule gradient between two plotted points on the split schedule curve that represent higher firing temperatures than the current firing temperature, and calculating a second applied split schedule gradient between two plotted points on the applied split schedule curve that represent the higher firing temperatures than the current firing temperature.

As previously mentioned, the split schedule curve includes plotted points that are set by a manual tuner, and the applied split schedule curve includes a split schedule plus bias for each point on the curve.

At step 1210, it is determined whether the first difference exceeds a predetermined limit. If it does not exceed a predetermined limit, an incremental split bias step is allowed to be taken at a lower firing temperature, shown at step 1214. If it does exceed a predetermined limit, an incremental split bias step is not allowed to be taken at a lower firing temperature, shown at step 1212. At step 1216, it is similarly determined whether the second difference exceeds a predetermined limit. If it does not exceed a predetermined limit, an incremental split bias step is allowed to be taken at a higher firing temperature, shown at step 1220. If it does exceed a predetermined limit, an incremental split bias step is not allowed to be taken at a higher firing temperature, shown at step 1218.

Figure 13:
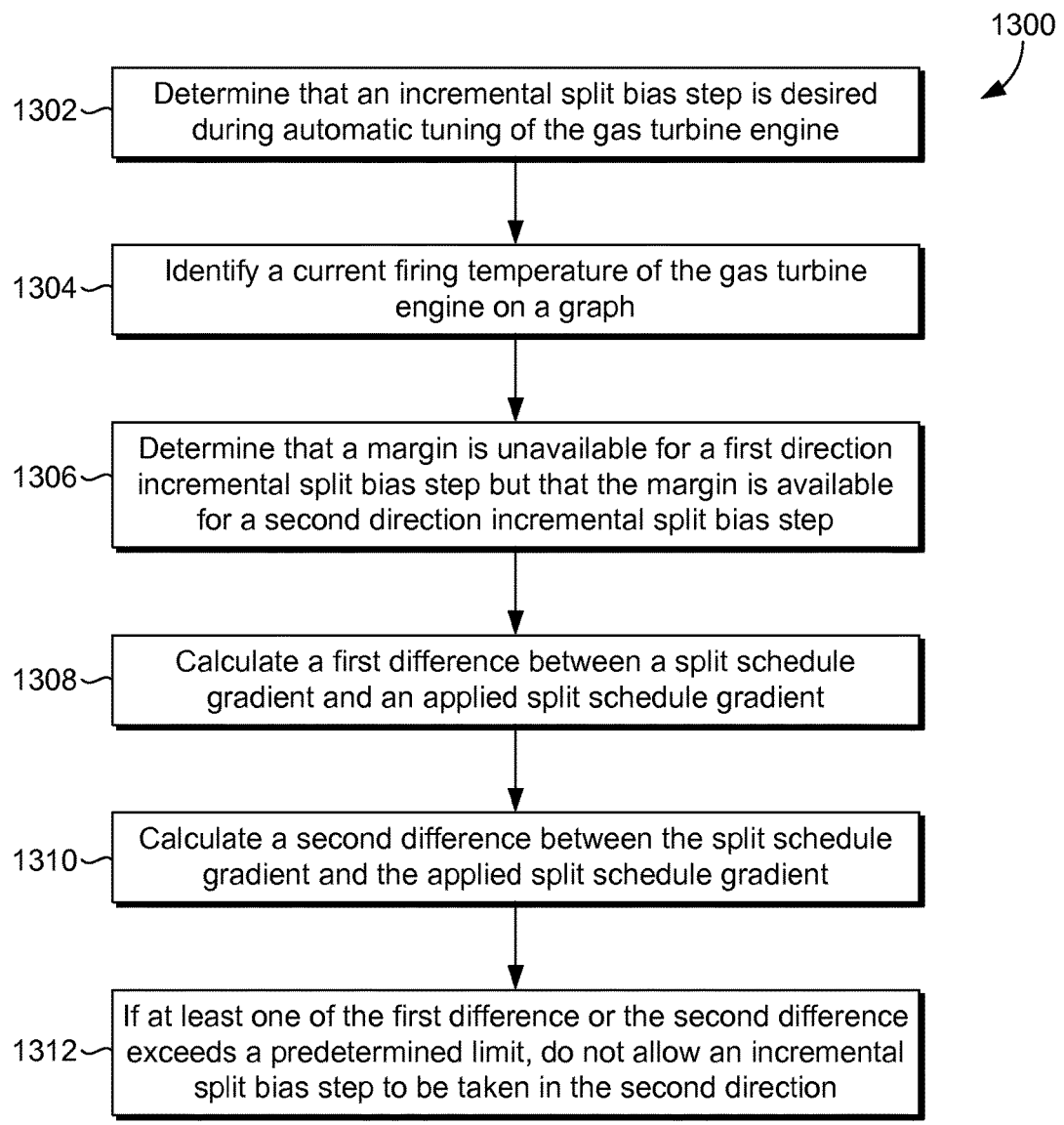
FIG. 13 is an exemplary flow diagram of another method for ensuring non-excessive variation of a gradient of an applied split bias versus firing temperature of a gas turbine engine, in accordance with an embodiment of the present invention.

FIG. 13 is an exemplary flow diagram of another method 1300 for ensuring non-excessive variation of a gradient of an applied split bias versus firing temperature of a GT engine, in accordance with an embodiment of the present invention. Initially at step 1302, it is determined that an incremental split bias step is desired during automatic tuning of the GT engine. A current firing temperature of the GT engine is identified on a graph at step 1304. At step 1306, it is determined that a margin is unavailable for a first direction incremental split bias step associated with a split bias in a first direction but that the margin is available for a second direction incremental split bias step associated with a split bias in a second direction. The first direction and the second direction correspond to higher temperatures or lower temperatures on the graph than the current firing temperature.

At step 1308, a first difference between a split schedule gradient and an applied split schedule gradient is calculated using, for example, plotted points on a split schedule curve and on an applied split schedule curve corresponding to the second direction (e.g., having higher or lower temperatures than the current firing temperature based on which has margin available, as determined at step 1306). At step 1310, a second difference is calculated between the split schedule gradient and the applied split schedule gradient using plotted points on the curves that are directly adjacent and that are on both sides to points corresponding to the current firing temperature. As such, one plotted point is to the left and one is to the right of the point associated with the current firing temperature. In one embodiment, a first of the plotted points used to calculate the second difference is associated with a lower firing temperature than the current firing temperature and a second of the plotted points is associated with a higher firing temperature than the current firing temperature. At step 1312, if at least one of the first difference or the second difference exceeds a predetermined limit, an incremental split bias step taken in the second direction is not allowed. In one embodiment, the plotted points on the curves corresponding to the second direction correspond to two plotted points on the split schedule curve or the applied split schedule curve that are directly adjacent to a point corresponding to the current firing temperature, or that are nearest to that point. In one embodiment, if neither the first difference nor the second difference exceeds the predetermined limit, the incremental split bias step is allowed to be taken in the second direction.

Figure 14:
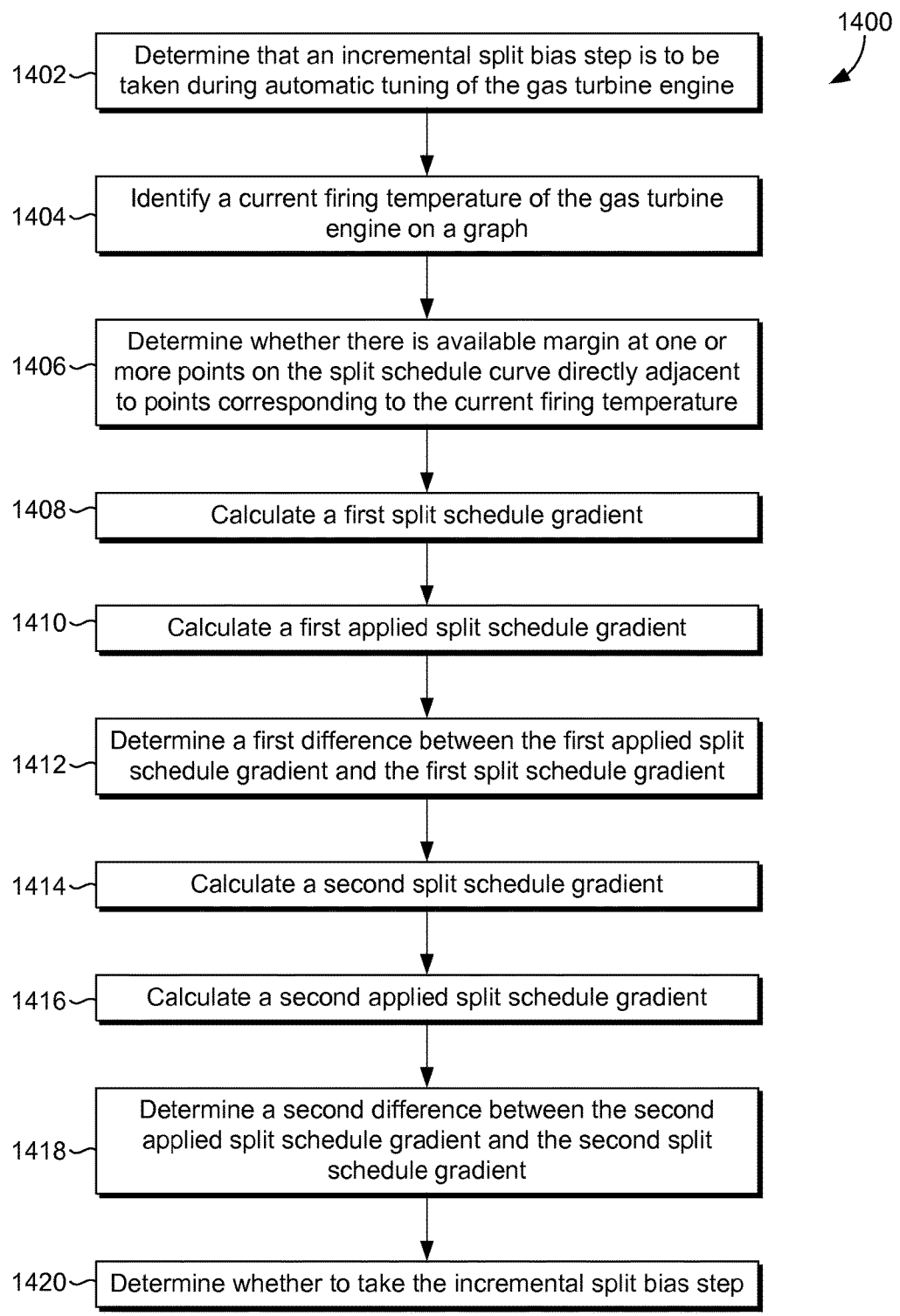
FIG. 14 is an exemplary flow diagram of another method for ensuring non-excessive variation of a gradient of an applied split bias versus firing temperature of a gas turbine engine, in accordance with an embodiment of the present invention.

FIG. 14 is an exemplary flow diagram of another method 1400 for ensuring non-excessive variation of a gradient of an applied split bias versus firing temperature of a GT engine, in accordance with an embodiment of the present invention. At step 1402, it is determined that an incremental split bias step is to be taken during automatic tuning of the GT engine. At step 1404, a current firing temperature of the GT engine is identified on a graph. At step 1406, it is determined whether there is available margin at one or more points on the split schedule curve directly adjacent to points corresponding to the current firing temperature. At step 1408, a first split schedule gradient is calculated. A first applied split schedule gradient is calculated at step 1410. At step 1412, a first difference between the first applied split schedule gradient and the first split schedule gradient is calculated. At step 1414, a second split schedule gradient is calculated. A second applied split schedule gradient is calculated at step 1416. At step 1418, a second difference between the second applied split schedule gradient and the second split schedule gradient is determined. It is determined, at step 1420, whether to take the incremental split bias step.

In order to make sure AutoTune is not restricted from saving a unit from a trip, the criteria described herein may not be applied to smooth out the bias curve if lean blow out is an issue. This illustrates how critical avoiding lean blow out is. The user-defined limit, thus, may be exceeded when tuning for lean blow out.

An alternative exemplary process for ensuring that the variation of the gradient of the applied split bias (manual split schedule plus bias) versus firing temperature or load does not become excessive during automated tuning of the gas turbine combustion system. Initially, a point on the applied schedule is considered as the point to potentially be incremented by a small split bias. The next point immediately to the left of the point to be incremented and the point to be incremented are used to calculate the slope (i.e. gradient of applied split versus firing temperature or load) of a line that joints these two points. This may be termed the left gradient. Next, the point immediately to the right of the point to be incremented and the point to be incremented are used to calculate the slope of a line that joins these two points. This may termed the right gradient. The difference between the left gradient and the right gradient is calculated. If the difference between one of these gradients is above a specific limit, the incremental split bias step is not allowed to be taken. This ensures that the applied split schedule remains relatively smooth as the split bias is automatically adjusted by AutoTune.

Various benefits arising from automatic tuning can be realized when automatic tuning is compared against the current tuning processes. That is, because the dynamic tuning process, employed in embodiments of the present invention, can be implemented automatically, many disadvantages of manually tuning are overcome. For instance, automatically executing a dynamic tune can be performed quickly, frequently, and accurately, which will substantially prevent degradation that would have occurred when using a slower and more deliberate manual tuning process. This frequent tuning reduces excess pollutants/promotes lower emissions while improving engine life.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. One or more non-transitory computer-readable media that, when invoked by computer-executable instructions, perform a method for ensuring non-excessive variation of a gradient of an applied split bias versus firing temperature of a gas turbine engine, the method comprising:
   determining that an incremental split bias step is to be taken during automatic tuning of the gas turbine engine;
   identifying a current firing temperature of the gas turbine engine on a graph that plots a firing temperature versus a percentage of split;
   calculating a first difference between a split schedule gradient and an applied split schedule gradient, each of the split schedule gradient and the applied split schedule gradient being calculated using plotted points on a split schedule curve or on an applied split schedule curve that correspond to lower firing temperatures than the current firing temperature, wherein the split schedule curve includes plotted points that are set by a manual tuner, and wherein the applied split schedule curve includes a split schedule plus bias for each point on the curve; and
   calculating a second difference between the split schedule gradient and the applied split schedule gradient, each of the split schedule gradient and the applied split schedule gradient being calculated using plotted points on the split schedule curve or on the applied split schedule curve that correspond to higher firing temperatures than the current firing temperature, such that,
      (1) if the first difference exceeds a predetermined limit, not allowing an incremental split bias step to be taken at a lower firing temperature that is lower than the current firing temperature, and
      (2) if the second difference exceeds a predetermined limit, not allowing the incremental split bias step to be taken at a higher firing temperature that is higher than the current firing temperature.

2. The one or more computer-readable media of claim 1, wherein the split schedule gradient is a slope between two plotted points on the split schedule curve.

3. The one or more computer-readable media of claim 1, wherein the plotted points that correspond to the lower firing temperatures correspond to two plotted points on the split schedule curve or on the applied split schedule curve that are directly adjacent to a point corresponding to the current firing temperature.

4. The one or more computer-readable media of claim 1, wherein the plotted points that correspond to the higher firing temperatures correspond to two plotted points on the split schedule curve or on the applied split schedule curve that are directly adjacent to a point corresponding to the current firing temperature.

5. The one or more computer-readable media of claim 1, wherein calculating the first difference further comprises:
   calculating a first split schedule gradient between two plotted points on the split schedule curve that represent lower firing temperatures than the current firing temperature, and calculating a first applied split schedule gradient between two plotted points on the applied split schedule curve that represent the lower firing temperatures than the current firing temperature.

6. The one or more computer-readable media of claim 1, wherein calculating the second difference further comprises:
   calculating a second split schedule gradient between two plotted points on the split schedule curve that represent higher firing temperatures than the current firing temperature, and
   calculating a second applied split schedule gradient between two plotted points on the applied split schedule curve that represent the higher firing temperatures than the current firing temperature.

7. The one or more computer-readable media of claim 1, wherein the applied split schedule gradient is a slope between two plotted points on the applied split schedule curve.

8. The one or more computer-readable media of claim 1, wherein the lower firing temperature that is lower than the current firing temperature is a firing temperature corresponding to a plotted point that is directly adjacent to a point corresponding to the current firing temperature.

9. One or more non-transitory computer-readable media that, when invoked by computer-executable instructions, perform a method for ensuring non-excessive variation of a gradient of an applied split bias versus firing temperature of a gas turbine engine, the method comprising:
- determining that an incremental split bias step is to be taken during automatic tuning of the gas turbine engine;
- identifying a current firing temperature of the gas turbine engine on a graph that plots a firing temperature versus a percentage of split;
- calculating a first difference between a split schedule gradient and an applied split schedule gradient, each of the split schedule gradient and the applied split schedule gradient being calculated using plotted points on a split schedule curve or on an applied split schedule curve that correspond to lower firing temperatures than the current firing temperature; and
- calculating a second difference between the split schedule gradient and the applied split schedule gradient, each of the split schedule gradient and the applied split schedule gradient being calculated using plotted points on the split schedule curve or on the applied split schedule curve that correspond to higher firing temperatures than the current firing temperature, such
  - (1) if the first difference exceeds a predetermined limit, not allowing an incremental split bias step to be taken at a lower firing temperature that is lower than the current firing temperature, and
  - (2) if the second difference exceeds a predetermined limit, not allowing the incremental split bias step to be taken at a higher firing temperature that is higher than the current firing temperature; and
  - (3) if the first difference does not exceed a predetermined limit, allowing an incremental split bias step to be taken at a lower firing temperature that is lower than the current firing temperature; and
  - (4) if the second difference does not exceed a predetermined limit, allowing the incremental split bias step to be taken at a higher firing temperature that is higher than the current firing temperature.

10. A method performed by a computing device having a processor and memory, the method for ensuring non-excessive variation of a gradient of an applied split bias versus firing temperature of a gas turbine engine, the method comprising:
- determining that an incremental split bias step is desired during automatic tuning of the gas turbine engine;
- identifying a current firing temperature of the gas turbine engine on a graph that plots a firing temperature versus a percentage of split;
- determining that a margin is unavailable for a first direction incremental split bias step associated with a split bias in a first direction but that the margin is available for a second direction incremental split bias step associated with a split bias in a second direction, wherein the first direction and the second direction correspond to higher temperatures or lower temperatures on the graph than the current firing temperature;
- calculating a first difference between a split schedule gradient and an applied split schedule gradient using plotted points on a split schedule curve and an applied split schedule curve corresponding to the second direction;
- calculating a second difference between the split schedule gradient and the applied split schedule gradient using plotted points on the split schedule curve and the applied split schedule curve that are directly adjacent and that are on both sides to points corresponding to the current firing temperature; and
- if at least one of the first difference or the second difference exceeds a predetermined limit, not allowing an incremental split bias step to be taken in the direction.

11. The method of claim 10, wherein the applied split schedule curve is a sum of the split schedule curve and split bias for each plotted point.

12. The method of claim 10, wherein the plotted points on the split schedule curve and the applied split schedule curve corresponding to the second direction correspond to two plotted points on the split schedule curve or the applied split schedule curve that are directly adjacent to a point corresponding to the current firing temperature.

13. The method of claim 12, wherein the two plotted points that are directly adjacent to the point corresponding to the current firing curve are the two plotted points nearest to the point corresponding to the current firing curve and that both either have higher firing temperatures or lower firing temperatures compared to the current firing temperature.

14. The method of claim 10, wherein the plotted points on the split schedule curve or the applied split schedule curve correspond to higher firing temperatures than the current firing temperature.

15. The method of claim 10, wherein the plotted points on the split schedule curve or the applied split schedule curve correspond to lower firing temperatures than the current firing temperature.

16. The method of claim 10, wherein a first of the plotted points used to calculate the second difference is associated with a lower firing temperature than the current firing temperature and a second of the plotted points is associated with a higher firing temperature than the current firing temperature.

17. The method of claim 10, further comprising if neither the first difference nor the second difference exceeds the predetermined limit, allowing the incremental split bias step to be taken in the second direction.

18. One or more non-transitory computer-readable media that, when invoked by computer-executable instructions, perform a method for ensuring non-excessive variation of a gradient of an applied split bias versus firing temperature of a gas turbine engine, the method comprising:
- determining that an incremental split bias step is to be taken during automatic tuning of the gas turbine engine;
- identifying a current firing temperature of the gas turbine engine on a graph that plots a firing temperature versus a percentage of split, the resulting curves being a split schedule curve whose plotted points are set by a manual tuner and an applied split schedule curve that includes the split schedule plus bias for each point on the curve;
- determining whether there is available margin at one or more points on the split schedule curve directly adjustment to points corresponding to the current firing temperature;
- calculating a first split schedule gradient between two points on the split schedule curve that represent lower firing temperatures than the current firing temperature;
- calculating a first applied split schedule gradient between two points on the applied split schedule curve that represent the lower firing temperatures than the current firing temperature;

determining a first difference between the first applied split schedule gradient and the first split schedule gradient;
calculating a second split schedule gradient between two points on the split schedule curve that represent higher firing temperatures than the current firing temperature;
calculating a second applied split schedule gradient between two points on the applied split schedule curve that represent the higher firing temperatures than the current firing temperature;
determining a second difference between the second applied split schedule gradient and the second split schedule gradient; and
determining whether to take the incremental split bias step, such that,
(1) if the first difference exceeds a predetermined limit, not allowing the incremental split bias step to be taken in a direction associated with the lower firing temperatures; and
(2) if the second difference exceeds a predetermined limit, not allowing the incremental split bias step to be taken in a direction associated with the higher firing temperatures.

\* \* \* \* \*